(12) United States Patent
Matsumoto

(10) Patent No.: US 8,212,916 B2
(45) Date of Patent: Jul. 3, 2012

(54) IMAGE DISPLAY DEVICE, IMAGE PICKUP APPARATUS, AND IMAGE DISPLAY METHOD THAT ALLOW FOCUS ASSISTANT DISPLAY

(75) Inventor: Toshiyuki Matsumoto, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 124 days.

(21) Appl. No.: 12/891,206

(22) Filed: Sep. 27, 2010

(65) Prior Publication Data
US 2011/0096220 A1    Apr. 28, 2011

(30) Foreign Application Priority Data
Oct. 22, 2009    (JP) ................................. 2009-243194

(51) Int. Cl.
*G03B 13/00*    (2006.01)
(52) U.S. Cl. .................... 348/346; 348/333.02
(58) Field of Classification Search .................. None
See application file for complete search history.

(56) References Cited

U.S. PATENT DOCUMENTS

| | | | | |
|---|---|---|---|---|
| 5,496,106 | A * | 3/1996 | Anderson | 348/255 |
| 7,889,270 | B2 * | 2/2011 | Yamada et al. | 348/346 |
| 7,978,247 | B2 * | 7/2011 | Nakajima et al. | 348/333.04 |
| 8,018,520 | B2 * | 9/2011 | Kobayashi et al. | 348/333.02 |
| 2003/0002870 | A1 * | 1/2003 | Baron | 396/147 |
| 2009/0096885 | A1 * | 4/2009 | Robinson et al. | 348/222.1 |

FOREIGN PATENT DOCUMENTS

JP    06-028392    2/1994

* cited by examiner

*Primary Examiner* — David Ometz
*Assistant Examiner* — Angel L Garces-Rivera
(74) *Attorney, Agent, or Firm* — Cowan, Liebowitz & Latman, P.C.

(57) ABSTRACT

An image display device that is capable of checking a focusing operation at the time of shooting by a user easily even if a small-sized monitor is used. A luminance-signal extracting unit extracts a luminance signal from a video signal. An amplitude change calculating unit calculates an amplitude change component of the luminance signal extracted. An edge-signal extracting unit extracts an edge signal from the luminance signal extracted. An amplitude calculating unit calculates an amplitude of the edge signal extracted. An amplitude-ratio calculating unit calculates a ratio of the amplitude of the edge signal to the amplitude change component of the luminance signal. A color conversion unit converts the edge signal to add colors according to the calculation result. An adder unit adds the color-converted edge signal and the luminance signal. A display unit displays the video signal to which the color-converted edge signal is added.

4 Claims, 3 Drawing Sheets

IMAGE DISPLAY DEVICE, IMAGE PICKUP APPARATUS, AND IMAGE DISPLAY METHOD THAT ALLOW FOCUS ASSISTANT DISPLAY

BACKGROUND OF THE INVENTION

1. Field of the Invention

The present invention relates to an image display device used for viewing an image etc. in an image pickup apparatus such as a video camera, an image pickup apparatus provided with this, and an image display method.

2. Description of the Related Art

In recent years, a camera-integrated recording/reproducing device (it is also described as a "camcorder", hereafter) that unifies a camera and a recording/reproducing device becomes widespread as a device that picks up moving images. The camcorder records subject images picked up by a camera into a recording medium while checking by a user on a small-sized monitor of a recording/reproducing device, and reproduces on the small monitor.

As a recording medium, although a magnetic tape was common conventionally, it is now replacing to mediums, which are smaller in size and higher in density, such as an optical disk, a hard disk drive, and a semiconductor memory. Accordingly, the size of a camcorder body is also decreasing.

The image picked up by the camcorder is appreciated mainly with a television for home. Since a high-definition television with a large screen is spreading as a television for home, a recording format of the camcorder is becoming to the high-definition format in order to satisfy a requirement to appreciate with the large screen. However, when the high-definition signal with high-resolution is reproduced on a large-sized screen, defocus of an image is significantly conspicuous as compared with a case when a low-resolution signal is reproduced on a small-sized screen.

As a monitor device (an image display device) for checking an object image at the time of shooting, a small-sized liquid crystal display monitor of which size is about three inches is used according to the size of the camcorder body. A resolution of such a small-sized liquid crystal display monitor is only a QVGA (Quarter Video Graphics Array: 320*240 pixels) class that does not have a quality sufficient to display the high-definition and high-resolution signal. Therefore, the small-sized liquid crystal display monitor is unsuitable for delicate focusing.

Then, a technique for assisting focusing is proposed. For example, Japanese Examined Patent Publication No. H06-028392 (JP H06-028392B) discloses a technique that colors an emphasized edge signal to emphasize an edge of a video signal.

When high-frequency components of a video signal is emphasized, an edge of a focused subject picture, i.e., a video signal with a clear edge, is further emphasized, because the edge includes many high-frequency components. On the other hand, since a defocused subject picture includes a few high-frequency components, an edge is not emphasized even if the high-frequency components are emphasized. Therefore, when paying attention to the edge portion of the video signal of which the high-frequency components are emphasized, it is easy to determine which portion is focused, because appearances are different depending on focusing conditions.

However, since a small-sized liquid crystal display monitor has a narrow dynamic range, the video signal of which the amplitude is more than a certain level is saturated. Therefore, when the amplitude of an edge correction signal that emphasizes the edge portion of the subject exceeds a threshold value for the saturation, the video signals are expressed as the same amplitude regardless of the amplitude of the edge correction signal. Therefore, the focused subject picture cannot be distinguished from the edge correction signal of the defocused subject picture. As a result, there is a problem that a user is difficult to focus.

SUMMARY OF THE INVENTION

The present invention provides an image display device, an image pickup apparatus, and an image display method that are capable of checking a focusing operation at the time of shooting by a user easily even if a small-sized liquid crystal monitor is used.

Accordingly, a first aspect of the present invention provides an image display device that allows a focus assistant display comprising a luminance-signal extracting unit configured to extract a luminance signal from a video signal of a subject image acquired by an image pickup unit, an amplitude change calculating unit configured to calculate an amplitude change component of the luminance signal extracted by the luminance-signal extracting unit, an edge-signal extracting unit configured to extract an edge signal from the luminance signal extracted by the luminance-signal extracting unit, an amplitude calculating unit configured to calculate an amplitude of the edge signal extracted by the edge-signal extracting unit, an amplitude-ratio calculating unit configured to calculate a ratio of the amplitude of the edge signal to the amplitude change component of the luminance signal, a color conversion unit configured to convert the edge signal to add colors according to the calculation result of the amplitude-ratio calculating unit, an adder unit configured to add the color-converted edge signal and the luminance signal, and a display unit configured to display the video signal to which the color-converted edge signal is added.

Accordingly, a second aspect of the present invention provides an image pickup apparatus that allows a focus assistant display comprising the image display device described as the first aspect, and an image pickup unit configured to pickup a subject image.

Accordingly, a third aspect of the present invention provides an image display method that allows a focus assistant display comprising a luminance-signal extracting step of extracting a luminance signal from a video signal of a subject image acquired by an image pickup unit, an amplitude change calculating step of calculating an amplitude change component of the luminance signal extracted in the luminance-signal extracting step, an edge-signal extracting step of extracting an edge signal from the luminance signal extracted in the luminance-signal extracting step, an amplitude calculating step of calculating an amplitude of the edge signal extracted in the edge-signal extracting step, an amplitude-ratio calculating step of calculating a ratio of the amplitude of the edge signal to the amplitude change component of the luminance signal, a color conversion step of converting the edge signal to add colors according to the calculation result in the amplitude-ratio calculating step, an adder step of adding the color-converted edge signal and the luminance signal, and a displaying step of displaying the video signal to which the color-converted edge signal is added.

According to the present invention, the user is possible to check the focusing operation at the time of shooting easily even if the small-sized liquid crystal display monitor is used.

Further features of the present invention will become apparent from the following description of exemplary embodiments with reference to the attached drawings.

DESCRIPTION OF THE EMBODIMENTS

Hereafter, embodiments according to the present invention will be described in detail with reference to the drawings.

Figure 1:
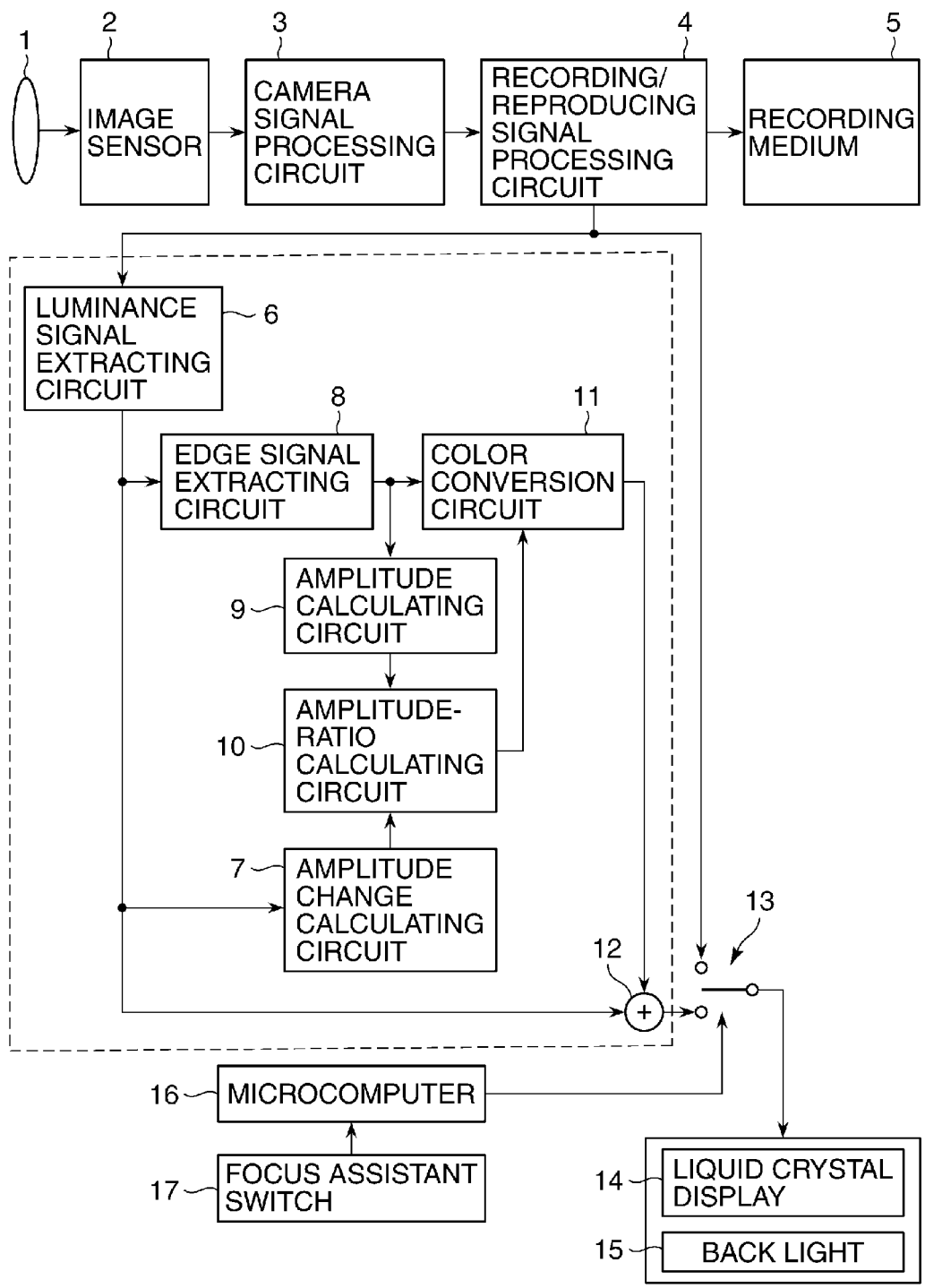
FIG. 1 is a block diagram schematically showing a basic configuration of an image pickup apparatus employing an image display device according to an embodiment of the present invention.

FIG. 1 is a block diagram schematically showing a basic configuration of an image pickup apparatus employing an image display device according to an embodiment of the present invention.

The image pickup apparatus of the embodiment according to the present invention is a camcorder having the illustrated configuration. The camcorder is provided with an image pickup optical system 1, an image sensor 2, a camera signal processing circuit 3, a recording/reproducing signal processing circuit 4, a recording medium 5, a luminance signal extracting circuit 6, an amplitude change calculating circuit 7, an edge signal extracting circuit 8, an amplitude calculating circuit 9, an amplitude-ratio calculating circuit 10, a color conversion circuit 11, and an adder circuit 12. Further, the camcorder is provided with a selection switch 13, a liquid crystal display 14, a back light 15, a microcomputer 16, and a focus assistant switch 17.

The image pickup optical system 1 is a lens group for forming a subject image on the image sensor 2. The image pickup optical system 1 adjusts a focal position of the subject image by moving the entire system or by moving a part of the system along an optical axis by a focusing mechanism (not shown). A photographer can select from auto-focusing and manual focusing as an operation of the focusing mechanism.

The image sensor 2, which employs a CCD (Charge Coupled Device) image sensor or a CMOS (Complementary Metal Oxide Semiconductor) image sensor, is an image pickup unit that photoelectrically converts the subject image into a video signal, and that transmits the signal to the camera signal processing circuit 3.

The camera signal processing circuit 3 processes the video signal, and transmits it to the recording/reproducing signal processing circuit 4. The recording/reproducing signal processing circuit 4 applies a recording signal process to the video signal, and transmits it to the recording medium 5. At the same time, the video signal is supplied to one input terminal of the selection switch 13 and to the luminance signal extracting circuit 6. The recording medium 5 is a built-in memory, a memory card, or the like, and the video signal to which the recording signal process has been applied is recorded thereto.

The luminance signal extracting circuit 6 removes color components of the video signal, and extracts only a luminance component (a luminance signal). The extracted luminance signal is supplied to the amplitude change calculating circuit 7. The amplitude change calculating circuit 7 calculates the amplitude change component. Simultaneously, the luminance signal is supplied to the edge signal extracting circuit 8. The extracted edge signal is supplied to the amplitude calculating circuit 9 and is supplied to the color conversion circuit 11.

The amplitude-ratio calculating circuit 10 calculates a ratio between the amplitude of the edge signal calculated by the amplitude calculating circuit 9 and the amplitude change component of the luminance signal calculated by the amplitude change calculating circuit 7, and supplies the calculation result to the color conversion circuit 11. The color conversion circuit 11 colors the edge signal of the video signal supplied from the edge signal extracting circuit 8. Colors are determined by the following comparisons among the ratio of the edge amplitude Ea to the luminance amplitude change Bac, a first reference value Th1, and a second reference value Th2 (Th1<Th2).

1. Ea/Bac>Th2 ... Red
2. Th1<Ea/Bac≦Th2 ... Yellow
3. Ea/Bac≦Th1 ... Blue

The edge signal with the converted colors is inputted into one input terminal of the adder circuit 12. The luminance signal outputted from the luminance signal extracting circuit 6 is inputted into the other input terminal of the adder circuit 12. The colored edge signal is added to the luminance signal by the adder circuit 12, and it is inputted to the other input terminal of the selection switch 13.

The output of the selection switch 13 is supplied to the liquid crystal display 14. The liquid crystal display 14 is irradiated with white light by the back light 15 from a back side, and displays an image on the screen.

The microcomputer 16 is a control unit which controls operation of the whole camcorder in generalization, and also controls the selection switch 13. Specifically, the microcomputer 16 controls the selection switch 13 as follows according to whether the focus assistant switch 17 selects a normal display mode or a focus assistant display mode.

When the focus assistant switch 17 selects the focus assistant display mode, the selection switch 13 is changed to the signal route at the side that selects the video signal outputted from the adder circuit 12 that adds the luminance signal to the edge signal of which the color is converted. On the other hand, when the focus assistant switch 17 selects the normal display mode, the selection switch 13 is changed to the signal route at the side that the video signal does not pass through the adder circuit 12. Thus, in this embodiment, the combination of the microcomputer 16 and the selection switch 13 functions as the display change unit that changes the display on the liquid crystal display 14.

Next, subject image examples displayed on the liquid crystal display 14 of the camcorder having the configuration shown in FIG. 1 and waveforms of the video signals will be described with reference to figures.

Figure 2:
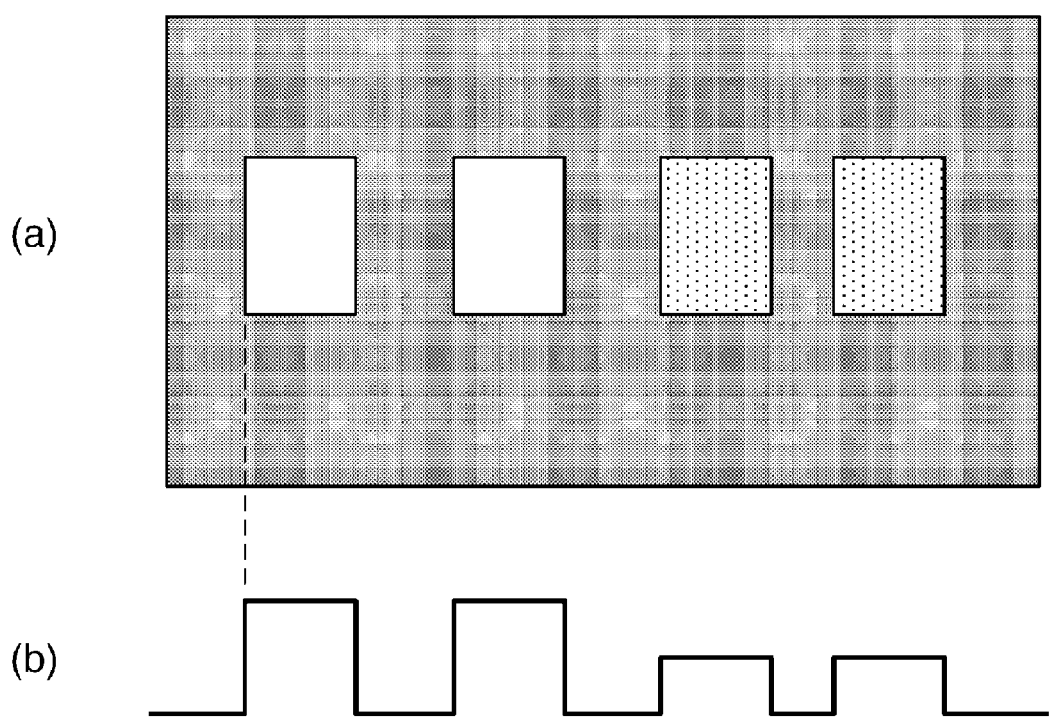
FIG. 2 is a view showing a relationship between a displayed image example in which all four subjects displayed on the image display device in FIG. 1 are focused, and an image waveform corresponding to the displayed image.

FIG. 2 shows relationship between a displayed image example displayed on the image display device and an image waveform corresponding to the displayed image. In FIG. 2, (a) shows the displayed image example in which all subjects are focused, when two white bodies and two gray bodies are shot as subjects. In FIG. 2, (b) shows the waveform of the image corresponding to the displayed image shown in (a).

Thus, when the bodies having different luminances are focused by the camcorder in FIG. 1, the amplitudes of the video signals differ corresponding to the difference in luminances.

Figure 3:
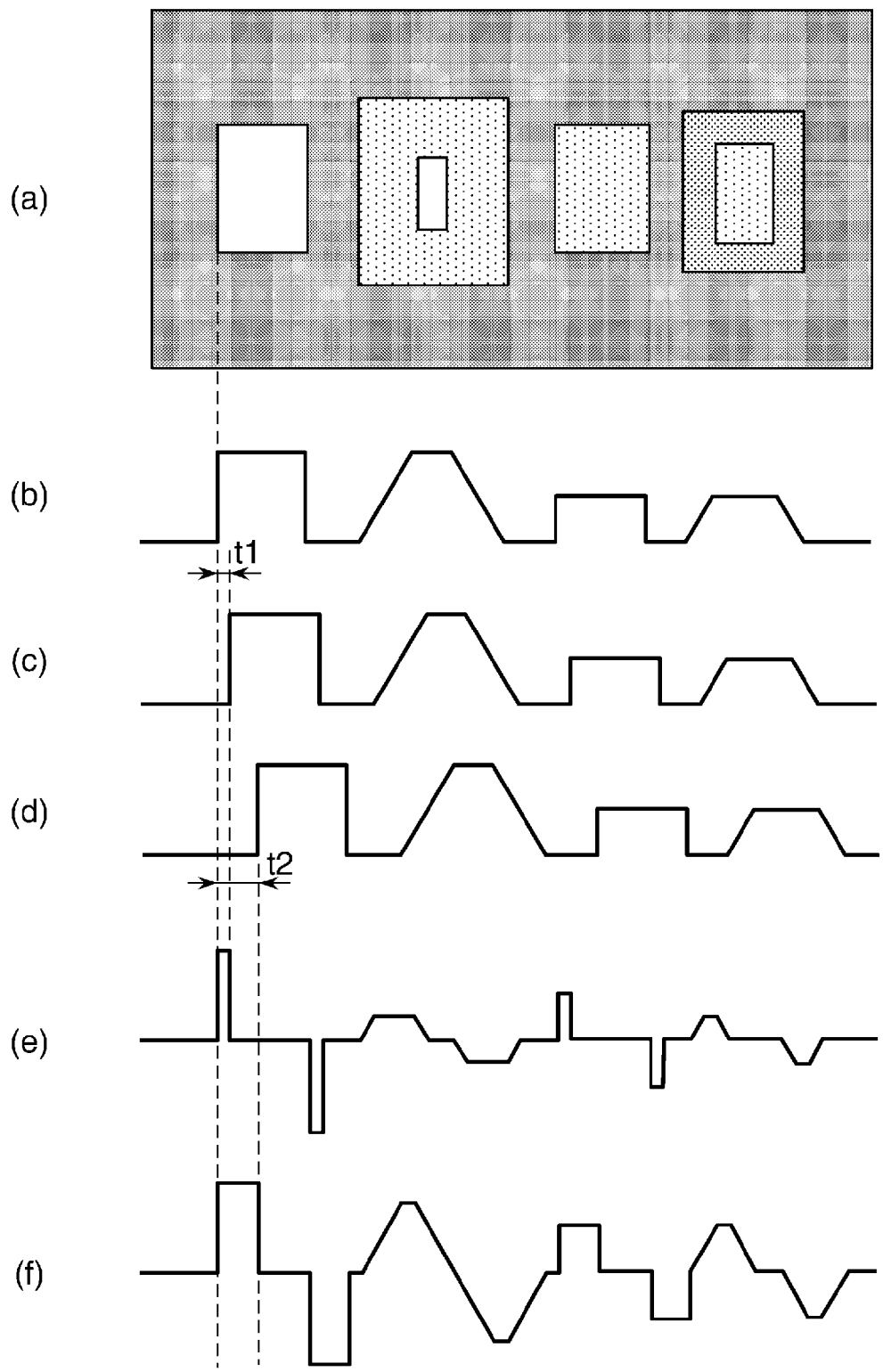
FIG. 3 is a view showing a relationship among a displayed image example in which two of four subjects displayed on the image display device in FIG. 1 are focused, an image waveform corresponding to the displayed image, and waveforms that are obtained by calculating the image waveform.

FIG. 3 shows relationship among a displayed image example displayed on the image display device, an image waveform corresponding to the displayed image, and waveforms that are obtained by calculating the image waveform. In FIG. 3, (a) shows the displayed image example in which two white bodies and two gray bodies are included as subjects. Although a left one of the left two white bodies and a left one of the right two gray bodies are in focus, a right one of the left two white bodies and a right one of the right two gray bodies are out of focus. In FIG. 3, (b) shows a waveform of the image shown in (a).

In FIG. 3, (c) shows a waveform that delays by time t1 from the waveform of (b), and (d) shows a waveform that delays by time t2 from the waveform of (c). Here, t1<t2.

In FIG. 3, (e) is a view showing a waveform that is obtained by subtracting the waveform of (c) from the waveform of (b). In FIG. 3, (f) is a view showing a waveform that is obtained by subtracting the waveform of (d) from the waveform of (b). Here, since t1 is smaller than t2, (e) in FIG. 3 serves as a view showing the high frequency component, i.e., the amplitude of the edge signal, of the waveform of (b). In FIG. 3, (f) serves as a view showing the low and middle frequency components of the waveform of (b), i.e., the amplitude change component of the video signal.

When calculating a ratio of the amplitude of the edge signal shown by (e) in FIG. 3 to the amplitude change component of the video signal shown by (f) in FIG. 3, it is understood that the ratio becomes large in the in-focus area and the ratio becomes small in the out-of-focus area. That is, the ratio makes clear the focusing condition relatively. Therefore, when colors that are different in accordance with the ratio are added to the edge signal, the focusing condition can be expressed by the colors. When the focusing condition is visually expressed by the different colors, it becomes easy to check the focusing condition even for a small-sized monitor that has been difficult for focusing conventionally.

Therefore, the camcorder should be configured so that the display is possible to switch the display between the normal display for displaying the video signal under the standard condition and the focusing condition checking display for displaying the video signal to which the colored edge signal is added.

According to the above-mentioned embodiment, since the edge portion is expressed by the different colors corresponding to the focusing condition, it becomes easy to check the focusing condition even for a small-sized monitor. As a result, even if the conventional small-sized liquid crystal display monitor is used, a user is able to check the focusing operation at the time of shooting easily.

The present invention is not limited to the embodiment described above, and various modifications and conversions are possible within the scope of the present invention. For example, an edge enhancement circuit, which emphasizes an edge by emphasizing a high frequency component of a luminance signal, may be added to the camcorder of FIG. 1. In such a case, the edge signal extracting circuit 8 may be configured so as to extract edge signal from the video signal of which the edge is emphasized by the edge enhancement circuit. This produces the same effect as the above-mentioned embodiment.

In this embodiment, the camcorder is described as an example of an image pickup apparatus having an image display device. However, the image pickup apparatus is not limited to the camcorder, an electronic still camera can be used as the image pickup apparatus, for example.

Although this embodiment shows the example where the combination of the microcomputer 16 and the selection switch 13 functions as the display change unit that changes the display of the liquid crystal display 14, the configuration of the display change unit is not limited to the above combination. For example, the display change unit may consist of only mechanical switches equivalent to the selection switch 13.

An image display mode for checking a focusing condition may be prepared for the time of shooting by the camcorder, and the edge signal may be colored by the above-mentioned method when the mode is switched to the image display mode by the selection switch 13.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-243194, filed on Oct. 22, 2009, which is hereby incorporated by reference herein in its entirety.

What is claimed is:

1. An image display device that allows a focus assistant display comprising:
    a luminance-signal extracting unit configured to extract a luminance signal from a video signal of a subject image acquired by an image pickup unit;
    an amplitude change calculating unit configured to calculate an amplitude change component of the luminance signal extracted by said luminance-signal extracting unit;
    an edge-signal extracting unit configured to extract an edge signal from the luminance signal extracted by said luminance-signal extracting unit;
    an amplitude calculating unit configured to calculate an amplitude of the edge signal extracted by said edge-signal extracting unit;
    an amplitude-ratio calculating unit configured to calculate a ratio of the amplitude of the edge signal to the amplitude change component of the luminance signal;
    a color conversion unit configured to convert the edge signal to add colors according to the calculation result of said amplitude-ratio calculating unit;
    an adder unit configured to add the color-converted edge signal and the luminance signal; and
    a display unit configured to display the video signal to which the color-converted edge signal is added.

2. The image display device according to claim 1, further comprising:
    a display change unit configured to switch a display between the normal display for displaying the video signal under the standard condition and the focusing condition checking display for displaying the video signal to which the color-converted edge signal is added.

3. An image pickup apparatus that allows a focus assistant display comprising:
    the image display device of claim 1, and
    an image pickup unit configured to pickup a subject image.

4. An image display method that allows a focus assistant display comprising:
    a luminance-signal extracting step of extracting a luminance signal from a video signal of a subject image acquired by an image pickup unit;
    an amplitude change calculating step of calculating an amplitude change component of the luminance signal extracted in said luminance-signal extracting step;

an edge-signal extracting step of extracting an edge signal from the luminance signal extracted in said luminance-signal extracting step;

an amplitude calculating step of calculating an amplitude of the edge signal extracted in said edge-signal extracting step;

an amplitude-ratio calculating step of calculating a ratio of the amplitude of the edge signal to the amplitude change component of the luminance signal;

a color conversion step of converting the edge signal to add colors according to the calculation result in said amplitude-ratio calculating step;

an adder step of adding the color-converted edge signal and the luminance signal; and a displaying step of displaying the video signal to which the color-converted edge signal is added.

* * * * *